United States Patent [19]

Stidham et al.

[11] Patent Number: 5,582,228
[45] Date of Patent: Dec. 10, 1996

[54] EXOTHERMIC WELDING CRUCIBLE AND METHOD

[75] Inventors: Curtis R. Stidham, Parma; Robert McPherson, Jr., Aurora; Thomas M. Dedo, Independence, all of Ohio

[73] Assignee: Erico International Corporation, Solon, Ohio

[21] Appl. No.: 425,405

[22] Filed: Apr. 20, 1995

[51] Int. Cl.⁶ .................................................. B23K 23/00
[52] U.S. Cl. ........................... 164/54; 228/234.3; 249/97; 249/108; 266/167
[58] Field of Search ............................. 266/167; 164/53, 164/54; 249/108, 97; 228/234.3

[56] References Cited

U.S. PATENT DOCUMENTS

| | | | |
|---|---|---|---|
| 1,883,755 | 10/1932 | Begtrup | 266/167 |
| 3,004,310 | 10/1961 | Burke | 164/54 |
| 3,022,554 | 2/1962 | Burke | 249/91 |
| 3,113,359 | 12/1963 | Burke | 164/54 |
| 3,234,603 | 2/1966 | Leuthy et al. | 164/54 X |
| 3,255,498 | 6/1966 | Leuthy et al. | 164/54 X |
| 5,145,106 | 9/1992 | Moore et al. | 228/234.3 |

OTHER PUBLICATIONS

Article–Cadweld® Electrical Connections, Materials and Tools, Section A, pp. A3–A8, Erico Products Inc., 1989.

*Primary Examiner*—Kenneth J. Ramsey
*Attorney, Agent, or Firm*—Renner, Otto, Boisselle & Sklar

[57] ABSTRACT

An exothermic welding apparatus and method uses a crucible which can be used with a variety of exothermic weld metal material volumes to produce welds of different sizes while maintaining the desired diameter to height ratio for each volume of exothermic material. In one embodiment, the crucible includes a double or two stage cavity. The crucible includes a somewhat smaller lower stage which reduces the diameter for smaller volumes. This lower stage may have two disk seats to isolate the two stages from the tap hole. A disk seat is provided for a larger disk between the two stages. The crucible may include a volume of exothermic material in the smaller lower chamber, the larger upper chamber, or a combination of both. In a triple stage embodiment, a wider variety of exothermic material volumes or masses may be accommodated, all while maintaining the desired diameter to height ratio for each charge. Although the desired ratio is approximately one, the ratio range should be maintained from about 0.5 to about 1.4, and no more than 2. The invention enables crucibles and molds to be used more economically and efficiently with the same crucible being useful in a wide variety and sizes of connections, all with a quality low impedance weld.

12 Claims, 2 Drawing Sheets

5,582,228

EXOTHERMIC WELDING CRUCIBLE AND METHOD

DISCLOSURE

This invention relates generally as indicated to exothermic welding and more particularly a crucible therefore, and a method of exothermic welding using the crucible.

BACKGROUND OF THE INVENTION

Exothermic welding is widely used in making electrical connections or reinforcing bar splices, for example. A wide variety of connections such as copper-to-copper or copper-to-steel, or aluminum-to-aluminum, as well as the apparatus for making such connections, are sold by ERICO, Inc. of Solon, Ohio under the registered trademark CADWELD®. The connections made are very low impedance connections and the ampacity is usually higher than that of the conductor or cable.

The apparatus involves a crucible and molds, the latter forming a cavity receiving the parts to be welded. The molds and crucibles may be formed in the same block of ceramic or graphite material, or in separate blocks such as seen in the copending application of Richard Singer et al., Ser. No. 08/381,640 filed Jan. 31, 1995, and entitled "Exothermic Welding Jig, Molds Therefor and Method".

Whether separate or single blocks are employed, the crucible includes a somewhat inverted frusto-conical cavity to contain the exothermic material. At the bottom of the cavity is a seat for a fusible steel disk which supports the exothermic material and below the disk is a tap hole which leads to the mold. The larger upper end of the crucible is closed by a cover. A starting powder is placed over the top of the exothermic material and may be ignited either with a flint gun or electrically. In another version of the process, the crucible is covered by a filter or baffle in a low emission process as sold by ERICO, Inc. under the registered trademark EXOLON®.

Exolon does not require starting material for most applications. An electric start system is used.

The crucible and molds are cleaned after use and reused. If properly cared for and cleaned, they can be used over and over again. With a separable crucible such as shown in the noted copending application, the same crucible may be used with many different size and types of connections. With different size and types of connections, the amount of exothermic material employed may vary widely. More material than necessary should not be employed for a variety of reasons, one of which is waste.

In the process, the molten metal separates from the slag and any slag or excess metal forms in a riser above the connection which is normally removed. In an ideal reaction, the mixture is ignited uniformly over the top area or diameter of the weld metal mass and proceeds downwardly to fuse the disk after a very brief delay. This allows time for complete reaction and for the slag to form and separate to the top of the weld metal. Otherwise, unreacted material or slag may be drawn into the mold adversely affecting the quality of the weld. This ideal condition is adversely affected if ignition does not occur uniformly over the top surface, but rather at one side or the other of the mixture of weld metal. The reaction then proceeds both horizontally across the diameter of the charge and vertically toward the disk. It can then be seen that if the diameter is significantly larger than the vertical height above the disk, fusing of the disk before a complete reaction of the mixture is more apt to occur. Thus, for assured quality welds, the ratio of the diameter of the weld metal volume to the height of the weld metal volume above the disk should be within a certain range.

Crucibles with a single chamber configuration are not suitable for welding connections of different sizes, since the chamber configuration is selected with a given discrete volume of exothermic material in mind to achieve the desired diameter to height ratio. If the volume varies, the ratio changes. For example, a crucible chamber designed for one size weld metal volume may not be suitable for another smaller amount since the height may be considerably less even though the diameter is only slightly smaller. The ratio, however, has changed significantly. This makes the crucible unsuitable for use with smaller molds requiring a larger inventory of crucibles and molds than would otherwise be required.

It would, accordingly, be desirable if a single crucible could accommodate various volumes (masses) of exothermic material while still maintaining the proper configuration of the volume of material to keep the diameter to height ratio within the proper range assuredly to form quality welds.

SUMMARY OF THE INVENTION

An exothermic welding apparatus and method uses a crucible which can be used with a variety of weld metal masses or volumes to produce welds of different sizes while maintaining the diameter to height ratio for each volume. In one embodiment, the crucible includes a double or two stage cavity. The crucible includes a somewhat smaller lower stage which reduces the diameter for smaller volumes. A disk seat is provided for a larger disk between the two stages. The crucible may include a weld metal in the smaller lower chamber, the larger upper chamber, or a combination of both. In a triple stage embodiment, a wider variety of weld metal volumes or masses may be accommodated, all while maintaining the desired diameter to height ratio for each discrete volume. Although the desired ratio is approximately one, the ratio range should be maintained from about 0.5 to about 1.4, and not more than 2.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
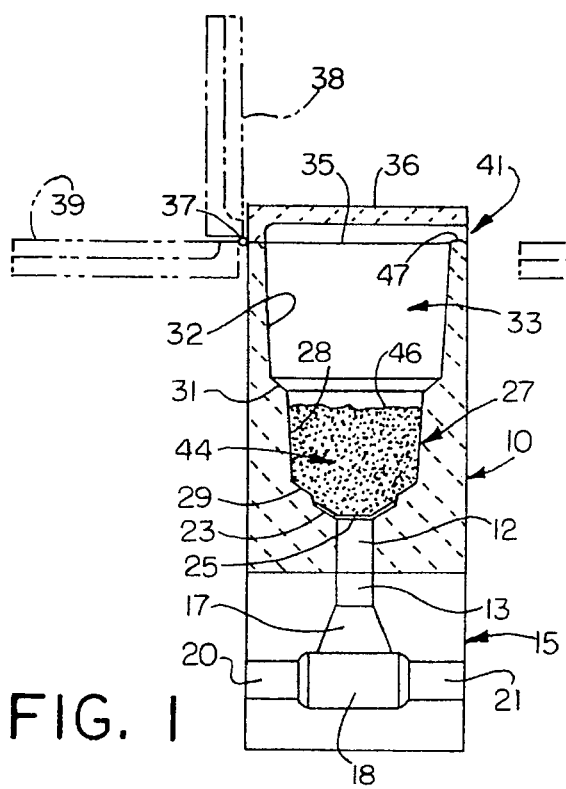
FIG. 1 is an illustration of a mold assembly with the crucible and cover in section, the crucible being a two stage crucible and having a smaller volume or amount of exothermic material appropriate for the mold.

Referring initially to FIG. 1, there is illustrated a crucible 10 in accordance with the present invention. The crucible is machined from a single block of ceramic or refractory material such as graphite and at its lower end includes a central relatively small diameter vertical tap hole 12. The hole 12 extends through the bottom of the crucible and is designed to mate with a top tap hole 13 in a mold 15 positioned beneath the crucible. The mold 15 is normally formed of two refractory blocks which may be vertically or horizontally split. In the illustrated embodiment, the blocks are vertically split and only the far block is illustrated. The near block is identical. The crucible and mold blocks may be held together in a jig such as illustrated in the copending application of Curtis R. Stidham, et al., Ser. No. 08/538,205, filed Jan. 31, 1995, and entitled "Exothermic Welding Apparatus". For a horizontally split mold and a jig therefor, reference may be had to the copending application of Richard E. Singer, et al., Ser. No. 08/381,640, filed Jan. 31, 1995, and entitled "Exothermic Welding Jig, Molds Therefor and Method".

The top tap hole 13 formed by the mold blocks communicates with a riser chamber 17 which in turn communicates with enlarged welding chamber 18. The aligned passages 20 and 21 on each end thereof receive the parts to be welded, the ends of which are preferably slightly spaced, in the center of the weld chamber.

At the top of the tap hole 12, the crucible is provided with an inwardly sloping annular seat 23 for a dished fusible steel disk 25 which in the illustration of FIG. 1 closes the top of the tap hole.

Above the steel disk 25 is a first smaller generally conical chamber or cavity 27. The conical chamber wall 28 terminates at its lower end in a somewhat larger disk seat 29 which is spaced slightly above the disk seat 23. The upper end of the wall 28 terminates at even larger disk seat 31 at the lower end of conical wall 32 forming larger upper chamber 33. The upper chamber or cavity 33 opens to the top 35 of the crucible.

The top of the crucible is provided with a cover 36 hinged at 37 so that it may be pivoted to the open positions shown in phantom lines at 38 or 39. It is noted that the cover 36 provides an arched roof creating an opening 41. The opening 41 enables the exothermic material shown at 44 within the crucible to be ignited with a spark gun or the like. While the cover contains the exothermic reaction within the crucible, the opening 41 provides egress for any smoke or fumes resulting.

It will be appreciated that instead of the hinged cover 36, a removable filter or baffle unit may be provided if the weld is to be made in a smoke or fume sensitive environment. The apparatus for such low emission process is sold by ERICO, Inc. of Solon, Ohio, under the registered trademark EXO-LON®.

In FIG. 1 the amount of exothermic material 44 fills only approximately the lower stage or section 27. The exothermic material, which is in the form of powders, has been placed in the lower stage of the crucible on top of the fusible disk 25 and a starting powder may be placed over the top of the exothermic material charge as indicated at 46. Additional starting powder may be placed on the lip of the opening 41 as indicated at 47. With the cover closed and the mold parts and crucible clamped together, the starting powder may be ignited creating the exothermic reaction which proceeds from the top down. The heat from the reaction fuses the disk 25 and permits the molten metal to drop into the weld cavity 18. Any slag formed rises to the top and collects at the upper end of the riser chamber 17. When the weld cools, the mold parts are separated and any excess material in the riser chamber is removed from the weld connection made. The parts are then cleaned for reuse. The process produces an excellent low impedance electrical connection.

In FIG. 1, the smaller amount of material 44 is employed because the weld chamber 18 is smaller. The amount of material 44 is selected for the size of the weld to be made.

In FIG. 1, the ratio between the diameter of the material 44 at the top and the height of the material above the disk 25 is approximately 1:1. This prevents any unreacted material or slag from being drawn into the weld cavity 18 by premature fusing of the metal disk.

Figure 2:
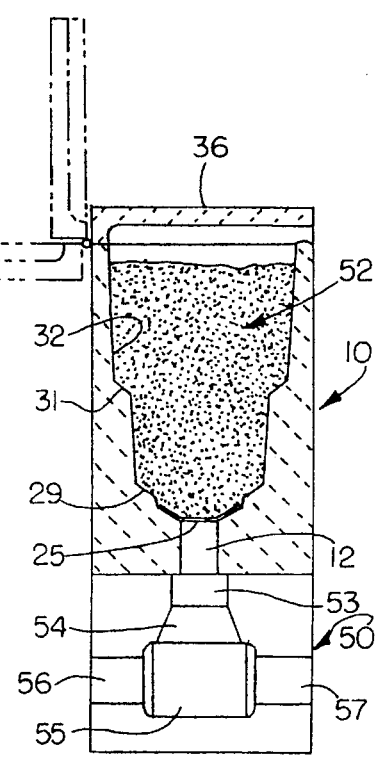
FIG. 2 is a similar illustration but with a larger mold and appropriately larger volume of exothermic material.

FIG. 2 illustrates the identical two stage crucible but with a different larger mold 50 and a larger amount of exothermic material seen at 52. The mold 50 includes a top tap hole 53 in communication with the tap hole 12 of the crucible. The mold also includes a somewhat larger riser chamber 54 communicating with the top of the larger weld chamber 55. Axially aligned passages 56 and 57 receive the parts to be welded in the chamber 55. In FIG. 2 the ratio of the height of the charge 52 to its top diameter is approximately 1½:1 and well within the parameters for a quality weld.

Figure 3:
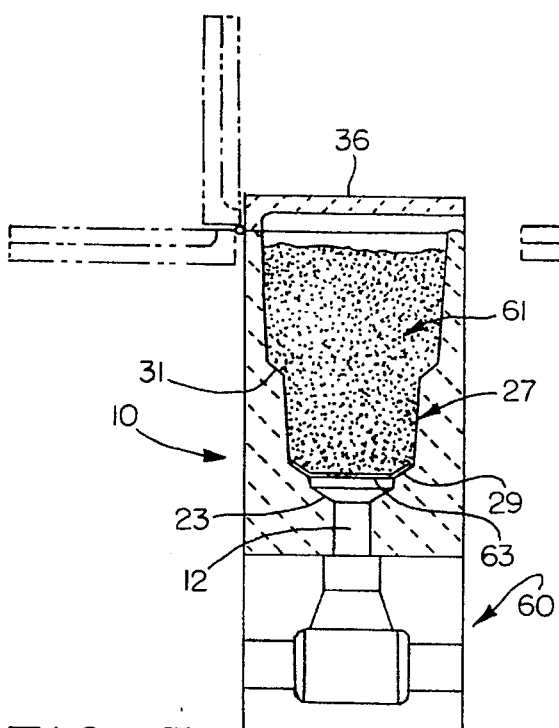
FIG. 3 is a similar illustration but with a slightly smaller volume with a larger disk on a different disk seat.

FIG. 3 illustrates again the identical crucible 10 but with a mold 60 which may be slightly smaller than the mold 50 and a corresponding slightly smaller amount of material 61. The reduction in the amount of material is obtained by utilizing a somewhat larger fusible disk 63 mounted on the somewhat larger disk seat 29. Accordingly, the weight of exothermic material 61 is somewhat smaller than that of material 52, although considerably larger than that of material 44.

It will also be appreciated that an even larger fusible disk may be placed on the seat 31 between the upper and lower stages with the material being in the upper chamber or stage only. This amount of material would be considerably larger than the amount of material 44 but smaller than the amount of material 52 or 61. Accordingly, with the two stage crucible illustrated in FIGS. 1 through 3, it is possible to tailor the amount of material to fit the mold requirements and still maintain the desired diameter to height ratio for each charge.

Figure 4:
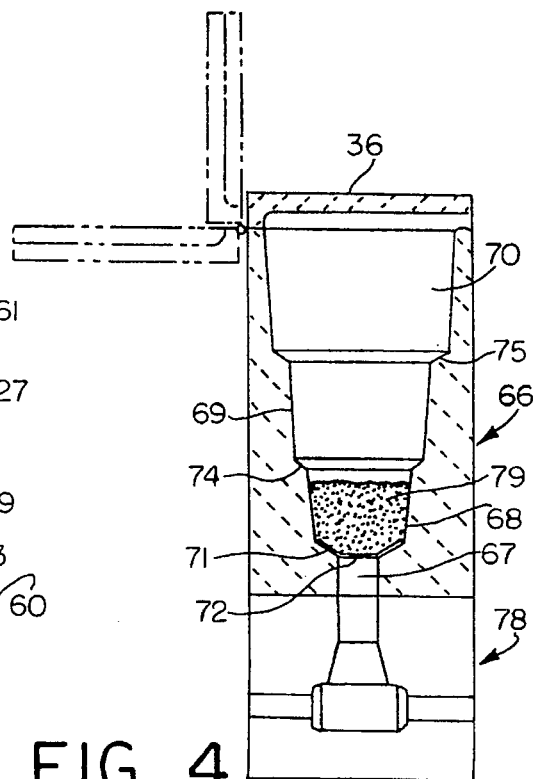
FIG. 4 is an illustration of a three stage crucible with a small amount of material and small mold.
Figure 5:
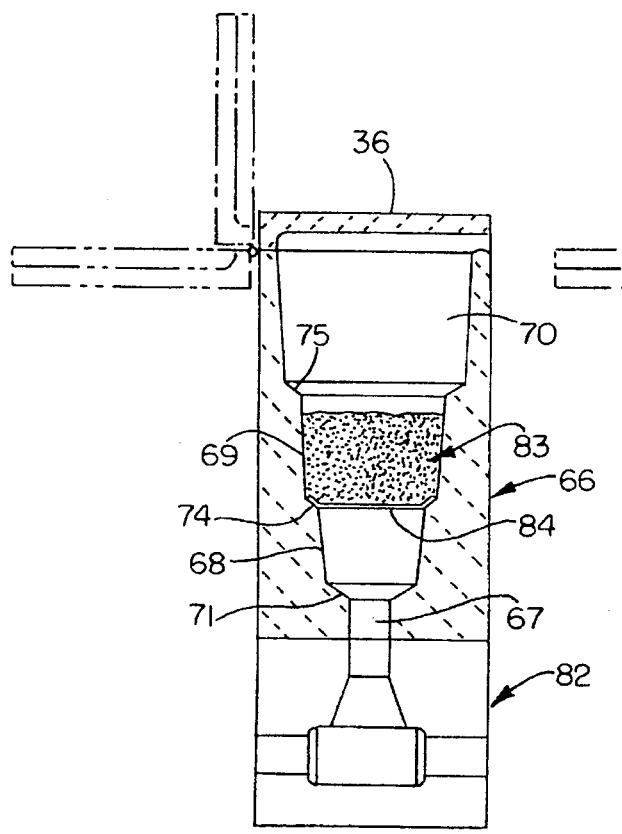
FIG. 5 is an illustration of the same crucible with a slightly larger volume and larger disk.
Figure 6:
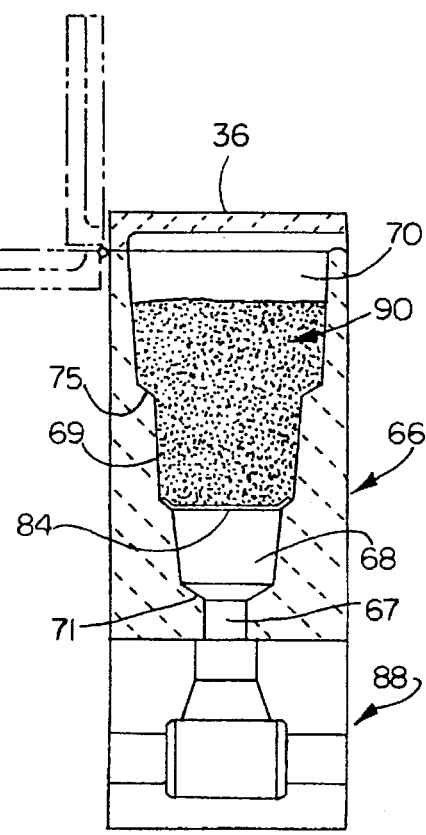
FIG. 6 is an illustration of the same crucible with a larger amount of material and a larger mold.

Referring now to FIGS. 4 through 6, there is illustrated a three stage crucible shown generally at 66. The crucible includes a bottom tap hole 67 and three separate aligned and stacked conical chambers or cavities seen at 68, 69 and 70 which are of increasing diameter. The bottom of the chamber 68 provides a seat 71 for disk 72 at the top of the tap hole 67. The transition between the chambers 68 and 69 also provides a somewhat larger, sloping disk seat 74, while the transition between the intermediate and upper sections 69 and 70 provides the larger, sloping disk seat 75.

FIG. 4 illustrates a relatively small mold 78 and a correspondingly small amount 79 of exothermic material in the lower stage of the crucible on top of disk 72. FIG. 5 illustrates an intermediate size mold 82 with an intermediate amount of material 83 on somewhat larger disk 84 positioned on the seat 74 between the lower and intermediate stages. The amount of material 83 is tailored to the size of the weld chamber of the mold 82. In FIG. 6, there is illustrated a larger mold 88 and a correspondingly larger amount of material 90 which is positioned on the same size disk 84 on the intermediate seat 74, but which occupies both the intermediate stage and the upper stage of the crucible. Again the amount of material is tailored to the weld chamber of the mold 88.

In the three stage embodiment of the present invention, it will be appreciated that any combination of the stages may be employed to size the amount of material to the exothermic weld cavity. For example, the chambers 68, 69 and 70 may be used individually to achieve progressively larger amounts of material. The use of all three chambers would provide for the largest amount. The use of the intermediate and upper chambers as in FIG. 6 would provide a relatively large intermediate amount. A somewhat smaller amount would be obtained by using only the lower two chambers. A somewhat larger intermediate amount would be obtained by using only the upper two chambers. Accordingly, a wide variety of material sizes may be tailored to fit the weld cavity utilizing the various disks and seats provided, all maintaining the diameter to height ratio required to make a quality weld.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A method of exothermic welding parts comprising the steps of forming a mold to receive the parts to be welded, and placing a crucible over such mold adapted to contain exothermic material to be ignited to form a molten metal to fill the mold and weld such parts together, comprising the step of replacing the mold to obtain a larger or smaller weld, and staging the crucible to receive at least two different quantities of exothermic material to maintain an optimum ratio range for the diameter and height of the exothermic material prior to ignition whereby the same crucible may be used with different size molds.

2. A method as set forth in claim 1 including the step of providing two stages vertically separate.

3. A method as set forth in claim 2 including the step of providing at least three stages.

4. A method as set forth in claim 2 including the step of providing each stage at its lower end with a fusible disk seat.

5. A method as set forth in claim 2 including the step of using one or the other or a combination of both stages to vary the amount of exothermic material.

6. A crucible for exothermic welding comprising a refractory vessel with a tap hole at the bottom, a seat for a fusible disk at the top of the tap hole, and a cavity above the disk seat for an insertion of the exothermic mixture, said cavity including two vertically separated sections staged for at least two different quantities of exothermic material to maintain the desired ratio of the cavity diameter to the height of the exothermic material above the disk for each quantity of material.

7. A crucible as set forth in claim 6 including at least three sections above the disk seat.

8. A crucible as set forth in claim 6 including a disk seat between each section.

9. A crucible as set forth in claim 6 including a disk seat for the lowermost section in addition to the disk seat at the top of the tap hole.

10. A crucible as set forth in claim 6 wherein each section is generally conical, and a sloping shoulder forming the disk seat at the lower end of each section.

11. A crucible as set forth in claim 8 wherein each section is generally conical, and a sloping shoulder forming the disk seat at the lower end of each section.

12. A crucible as set forth in claim 11 including at least three sections above the respective disk seats.

* * * * *